United States Patent

Van Den Mosselaar et al.

Patent Number: 5,701,812
Date of Patent: Dec. 30, 1997

[54] DEVICE FOR SCRAPPING CARS

[75] Inventors: Franciscus Laurentius Maria Theresia Van Den Mosselaar, Dongen; Gerrit Johannus Termaten, Lochem; Leonardus Theodorus Maria Reuser, Ede, all of Netherlands

[73] Assignee: Car Recycling Systems "CRS" B.V., Ede, Netherlands

[21] Appl. No.: 631,183

[22] Filed: Apr. 12, 1996

[51] Int. Cl.$^6$ ................................................. B30B 9/32
[52] U.S. Cl. .................... 100/91; 29/426.3; 29/426.4; 100/215; 100/233; 100/901
[58] Field of Search ........................... 100/215, 233, 100/901, 91; 29/426.3, 426.4, 426.6

[56] References Cited

U.S. PATENT DOCUMENTS

| | | | |
|---|---|---|---|
| 3,367,769 | 2/1968 | Schott | 100/901 |
| 3,554,119 | 1/1971 | Schoellhorn et la. | 100/901 |
| 3,613,562 | 10/1971 | Brewer | 100/901 |
| 3,651,754 | 3/1972 | Forest | 100/901 |
| 4,037,302 | 7/1977 | Hollander | 29/426.3 |
| 4,094,240 | 6/1978 | Suzuki | 100/901 |
| 4,905,363 | 3/1990 | Boyenval | |
| 5,163,804 | 11/1992 | Kobayashi | |
| 5,335,406 | 8/1994 | Van Den Mosselaar et al. | 29/426.4 |

FOREIGN PATENT DOCUMENTS

| | | | |
|---|---|---|---|
| 0 299 812 | 1/1989 | European Pat. Off. | |
| 0 544 342 | 6/1993 | European Pat. Off. | |
| 1 146 234 | 3/1963 | Germany | |
| 36 40 501 | 9/1988 | Germany | |
| 41 20 948 | 1/1992 | Germany | |
| 92 04 324 | 10/1993 | Germany | |
| 7605096 | 11/1976 | Netherlands | 100/901 |

Primary Examiner—Stephen F. Gerrity
Attorney, Agent, or Firm—Foley & Lardner

[57] ABSTRACT

Device for scrapping cars (26), in which the car is guided along some stations by a conveyor trolley (25) provided with pivotably mounted supporting members (30). One of the stations comprises a turning device for rotating the car around its longitudinal axis, whereby the bottom side of the car is accessible from above. The turning device comprises a pair of clamping bars (18) that can be pushed towards and away from each other by pivotable legs (17) supported by a bridge (13) being pivotably supported by a framework (2), in such a way that the bridge is rotatable around its longitudinal axis and adjustable in height. At the end of the transport track (31) there is a press for crushing the body of the scrapped car, substantially consisting of metal.

16 Claims, 5 Drawing Sheets

DEVICE FOR SCRAPPING CARS

FIELD OF THE INVENTION

The invention relates to a device for scrapping cars, said device comprising: conveyor trolleys for guiding the car along several stations in order to be stopped at a station for undergoing certain operations at that station, at least one of the stations being provided with a turning device for bringing the car up over a certain distance and rotating it around its longitudinal axis, as a result of which the bottom side of the car is accessible from above.

BACKGROUND OF THE INVENTION

With a similar device, known from EP-A-0544342, the turning device comprises a pair of clamping bars, being provided with clamping members, which are connected to supporting members, in such a way that they can be pushed towards and away from each other for receiving and releasing a car, said supporting members in turn being connected to means for moving the system of supporting members and clamping bars in vertical height and pivoting it.

The supporting members comprise a horizontal framework that can be adjusted in vertical height at its four angular points along vertical columns and which has its sides square to the direction of movement being provided with means for rotatably supporting the supporting members carrying the clamping bars.

This requires that on supplying a car to the device, the framework must be in the highest position. After interposing the car, the framework is lowered around the car. Then, the car can be clamped by the clamping bars and the framework can be brought up, so that the car can be turned. After performing operations on the car, it is rotated back to its original position and the framework is lowered again. Then, the car is released by the clamping bars and the framework must be brought up in order to be able to remove the car from the device.

It will be obvious, that bringing the framework down and up, when a car is positioned in the device or should be removed therefrom, takes up time during which one can not work on the car.

SUMMARY OF THE INVENTION

The object of the invention is to remove this difficulty and to that end provides for, that the supporting members, carrying the supporting bars, are constituted by legs mounted in pairs and projecting upward, being rotatably supported near their upper ends by a bridge extending in longitudinal direction, which in turn is supported by a framework in such a way, that the bridge is rotatable around its longitudinal axis and adjustable in vertical height, means being present for pivoting the legs in such a way that the clamping bars can be moved towards and away from each other, and means for adjusting and rotating the bridge in vertical direction.

Due to this, it is achieved that with the help of a conveyor trolley, a car can be driven between the clamping bars in order to be clamped by means of rotation of the legs. Subsequently, it can be lifted across a certain distance by moving the framework in such a way that the bridge is brought up. Then, the bridge can be rotated so that the car can be rotated around its longitudinal axis. After working on the bottom side of the car, the bridge is rotated back, brought down, the car is positioned on the conveyor trolley, the clamping bars are released and the car can be driven from between the clamping bars.

It will be provided for, that the legs are rotatably connected to the bridge in pivots at a distance from each other, that the ends not being provided with the clamping bars are at the other side of the pivots and are connected to each other by a pressurized medium cylinder for varying the distance between these ends, and with coupling means being present between both legs in such a way that during operating the pressurized medium cylinder, the legs will be rotated over almost the same angle.

By mounting the pivots of the legs at a distance from each other, the legs can extend substantially parallel and about vertically. Owing to this, they will easily be able to enclose a car. Further, by means of the structure described, the legs can be rotated with the help of one single pressurized medium cylinder.

Said coupling means between both legs can be constituted by at least one coupling plate being pivotably connected to both legs in such a way that the pivot points are at different sides of pivot points of the legs and the centre of the connecting line between the pivot points coincides with the centre of the connecting line between the pivot points of both legs.

Since the car need not be lifted across a large distance, it can be provided for, that the framework, which serves for supporting the bridge, is at one longitudinal side pivotably connected to the frame of the device in such a way that by rotating the framework around the pivot, the bridge being connected to the framework at a distance from the pivot is adjusted in vertical height.

Rotating the bridge can take place e.g. with the help of a chain being connected to a locking pin, in such a way that on pulling the chain, the locking pin first has to be pulled from a hole made in the frame, against the force of a spring, before the bridge is free to rotate.

Across the displacement route of the bridge, a number of holes will be made in the frame. Should the chain break or should a malfunction arise in the mechanism that pulls the chain, then the action of the spring will cause the locking pin to be pressed into a hole in the frame, so that the bridge can only make a slight movement. Due to this, the safety of the device is considerably improved.

According to the invention, it can further be provided for, that the conveyor trolleys, meant for transporting the cars to be scrapped along the various stations, have each of their longitudinal edges provided with two supporting members being pivotable across almost 180°, that can be positioned in the desired distance from each other in longitudinal direction of the trolley in such a way, that in the outward pivoted state, the supporting members of a conveyor trolley substantially extend horizontally and can serve for supporting the wheels, or the axles of a car, while in the inward pivoted state, the supporting members partially overlap and are within the contours of the trolley.

Owing to this, at the end of the conveyor track, the trolleys can easily be prepared for returning them to the beginning of the track. At the beginning of the track, the supporting members need only be pivoted outwards. In this way, it is also achieved, that each car can be supported properly, even when a considerable damage of wheel supports has occurred, such as can be the case with scrap cars.

Just like with the known device, the conveyor trolleys can be brought to the beginning and the end of the conveyor track on track portions movable in vertical direction for bringing a conveyor trolley at the highest level at the beginning of the track for picking up a car, and bringing it at the lowermost level of the track for returning the empty conveyor trolley to the beginning of the conveyor track.

According to the invention, the conveyor trolleys are provided with means by which, at least at the beginning and end of the conveyor track, they can engage with drivers mounted to drivable endless chains, with the track portion adjustable in height being provided with two chains being movable in opposite directions, and each of the upper and lower portions of the conveyor track directly connecting thereto being provided with a chain movable in one direction and connecting to the one of first mentioned chains moving in the same direction.

In this way, a positive displacement of the conveyor trolleys can be obtained, and one is not dependent on gravity for bringing the conveyor trolleys on said track portions. Because of this, the security of the device is enhanced as well, since the conveyor trolleys will not be able to come in motion at an undesirable time at the beginning and end of the track.

Further, means for releasably coupling the conveyor trolleys on the highest track portion to the chain concerned can be provided.

Then, it will not be necessary that in a certain instant, all trolleys being in use should be driven to a subsequent work station simultaneously.

Further, according to the invention it is provided for, that near the end of the conveyor track, a press is mounted for pressing flat the remaining part of the car, the body in particular, as it is taken from a conveyor trolley.

Since this remaining part is almost completely of metal, a simple type of press can be employed. One obtains high-grade scrap that can easily be transported, since comparatively it does not take up much space.

In particular, the press can consist of a fixed bearing plate and two clamping jaws, which are pivotably connected to the bearing plate near its longitudinal edges and which, by means of pressurized medium cylinders, can be brought from a position in which they substantially release the bearing plate for positioning a car body thereon, to a position above the bearing plate under compressing the car body, in which position the longitudinal edges of the clamping jaws are almost in line with each other.

In order to prevent parts of the car body from falling between the longitudinal edges of the clamping jaws, a support directed upwards can be mounted near one of the longitudinal edges of the bearing plate, which, at a distance above the bearing plate, and above the clamping jaw concerned when it is in the upward directed position, is provided with an arm pivotably connected therewith, which arm can be pivoted towards the bearing plate for crushing the roof of a car body to be treated in longitudinal direction, or for pivoting both clamping jaws crushing the car body towards the bearing plate.

Finally, the device can comprise a waste glass container, with a side wall of the container having a slot in which a car door can be slid in a substantially horizontal position, with an impact device being provided above the waste glass container in such a way, that a sharp pin can exert an impact on the window of the car door for splintering the glass so that the splinters fall into the waste glass container.

BRIEF DESCRIPTION OF THE DRAWINGS

The invention is further explained by way of embodiments illustrated in the drawing, in which.

DETAILED DESCRIPTION OF THE PREFERRED EMBODIMENT

Figure 1:
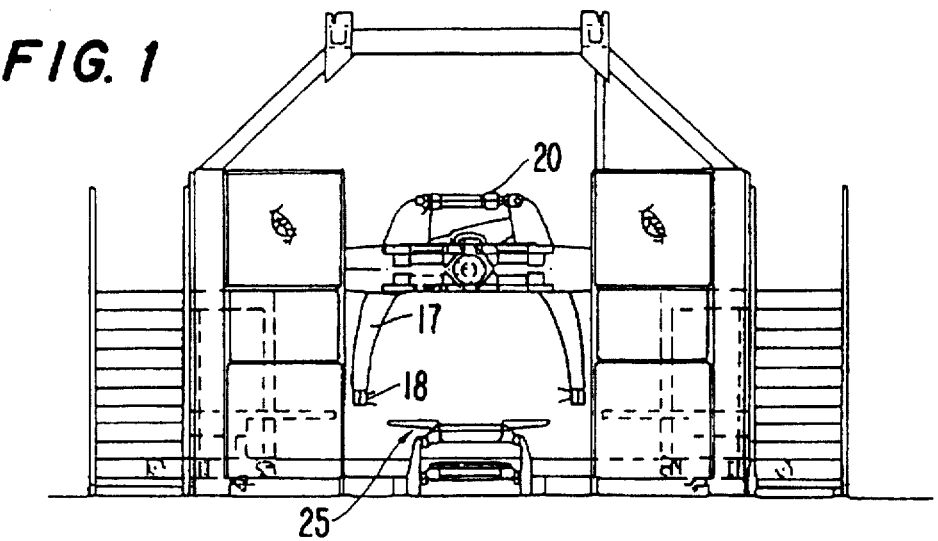
FIG. 1 shows a view of a turning device in the position in which a car is situated there, that either is to be treated, or has been treated.
Figure 2:
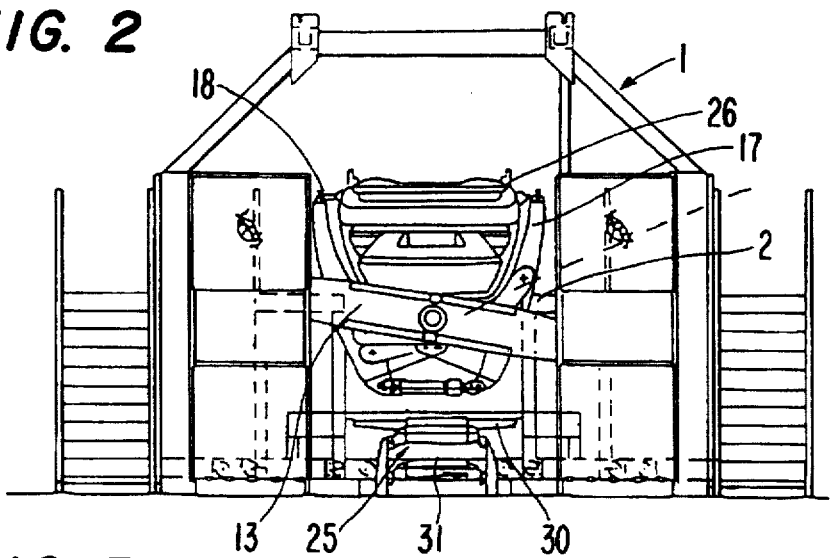
FIG. 2 shows a view corresponding to FIG. 1, in the position in which the car has been clamped and turned.
Figure 3:
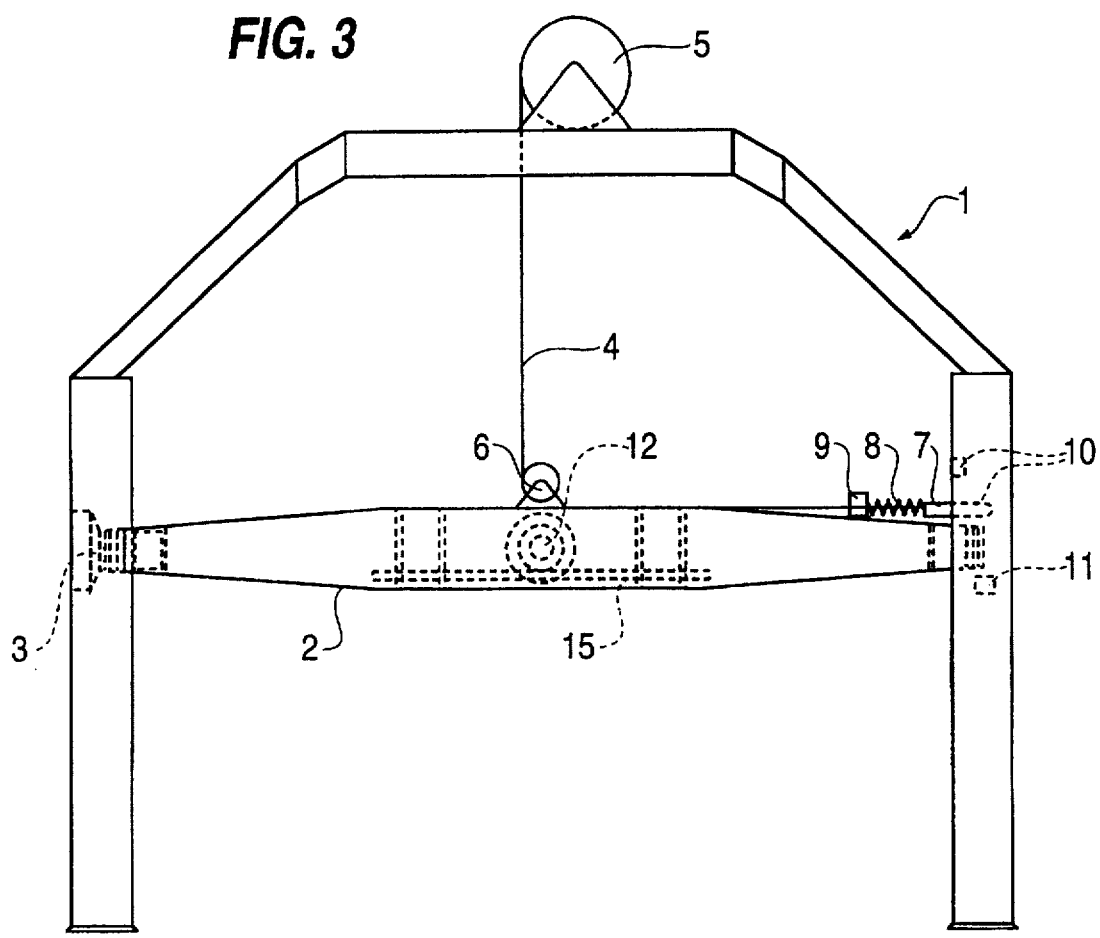
FIG. 3 shows a view of the frame of the device of the FIGS. 1 and 2 with the framework supported by it.

The turning device shown in the FIGS. 1-4 comprises the frame 1, shown in view in FIG. 3 and consisting of two portals being at a distance from each other and are connected to each other in a way not further indicated. The frame 1 supports the framework 2 in the pivots 3, while the framework is pivotable by means of at least one chain 4, or cable. The chain 4 can be wound onto a rotatably arranged roller 5 that can be driven by a—not further indicated—hydraulic motor. The end of the chain 4 turned away from the roller 5 runs across a guiding roller 6 and is connected to a pin 7 being slidably supported by the framework 2. The pin 7 is pushed towards the leg of the frame 1 by a spring 8. The other end of the spring 8 lies against a support 9 fixedly connected to the framework 2. The spring 8 can push the pin 7 into one of the holes 10 in the leg of the frame 1. Due to this, the side of the framework 2 being near the pin can be locked in relation to the frame 1. When the framework should be pivoted by means of the chain 4, first the pin 7 is pulled from the hole 10 on tensioning the chain, in order to then move the end of the framework being near it upwards. As soon as by a certain cause the tensile force of the chain 4 disappears, the pin 7 will be pushed into a hole 10 so that the framework 2 can only perform a limited stroke. Additionally, an adjustable stop will be mounted to the frame 1 so that the pivotable end of the framework will be supported in its lowermost position.

Figure 4:
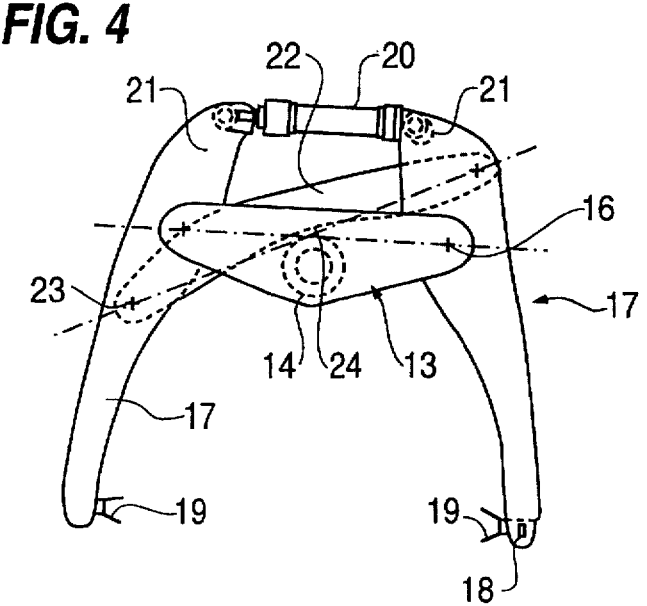
FIG. 4 shows a view of the bridge to be incorporated in the framework of FIG. 3, and of the legs with the clamping bars connected therewith.
Figure 3A:
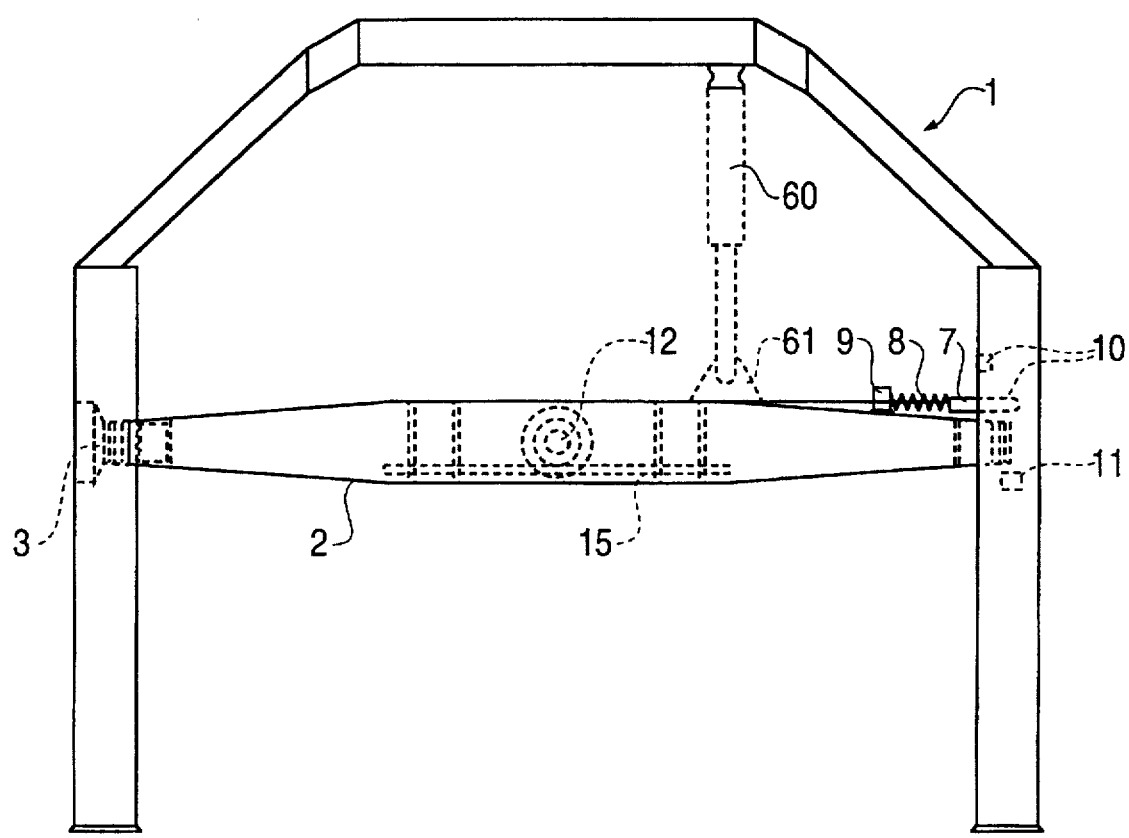
FIG. 3A shows a view of the frame of the device of FIGS. 1 and 2 with the framework supported by it.

The framework 2 is provided with the pivots 12 for supporting a bridge 13, which is shown in particular in view in FIG. 4. For rotating the bridge 13, at one or both of its ends it can be provided with a gear wheel 14 meshing with a gear rack 15 being slidably supported in the framework 2. Sliding the gear rack 15 can take place with the help of a pressurized medium cylinder not further indicated.

The bridge 13 has pivots 16 for rotatably supporting legs 17, at their lower ends connected to the clamping bars 18, on which clamping brackets are slidable. The position of the clamping brackets can be adapted to the car to be scrapped. Generally, two spaced apart pairs of legs 17 will be present, so that each clamping bar 18 is supported by two legs.

Moving the two clamping bars 18 in relation to one another is performed by a pressurized medium cylinder 20 being mounted between the upper ends 21 of the legs 17. In order to achieve, that the legs 17 will pivot across approximately the same angle on operating the cylinder 20, the legs 17 are coupled to each other by coupling plates 22, only one of them being illustrated in FIG. 4 for reasons of clarity. At the points 23, the coupling plate 22 is pivotably connected to both legs 17. The centre 24 of the line connecting the points 23 coincides with the centre of the line connecting the pivots 16.

As appears from the FIGS. 1 and 2, a car 26 situated on a conveyor trolley 25 can be brought between the clamping bars 18. By operating the cylinder 20, the bars 18 can be brought towards each other in order to clamp the car. Subsequently, the framework 2 is pivoted by means of the chain 4, for lifting the car 26 from the conveyor trolley 25. Possibly, the bridge 13 can be pivoted in relation to the framework, so that the car 26 moves vertically upwards. Then the bridge 13 is pivoted, so that the car 26 reaches the position as indicated in FIG. 2. Thereupon, work platforms and receptacles not further indicated will be pushed towards and under the car, respectively. After carrying out the work on the cars, the cycle is repeated in reverse direction in order to bring the car on the conveyor trolley 25 again. After moving the conveyor trolley 25, a next car can be brought into the device immediately.

Figure 5:
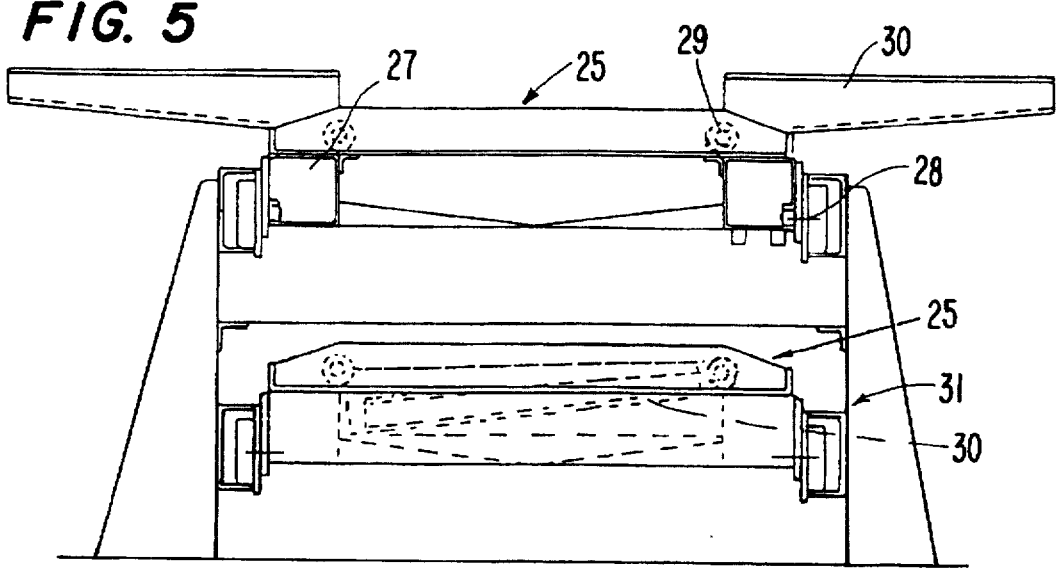
FIG. 5 shows a view of two conveyor trolleys, one of which being at the upper track and the other on the lower track.

A conveyor trolley 25 is shown in particular in FIG. 5. It comprises the rectangular framework 27 being provided with four wheels 28. Further, the framework 27 four pivots 29, to wit two at each longitudinal side. Alongside each pivot, a supporting member 30 is slidable, so that the supporting members can be adjusted to the distance between the front and rear axle of the car to be scrapped. Further, the supporting members 30 are pivotable from the position shown in the upper part of FIG. 5 into the position shown in the lower part of that Figure. In the former position, a car to be scrapped can be positioned onto the conveyor trolley 25 and in the second position, the empty conveyor trolley can be returned to the beginning of the track 31.

Figure 6:
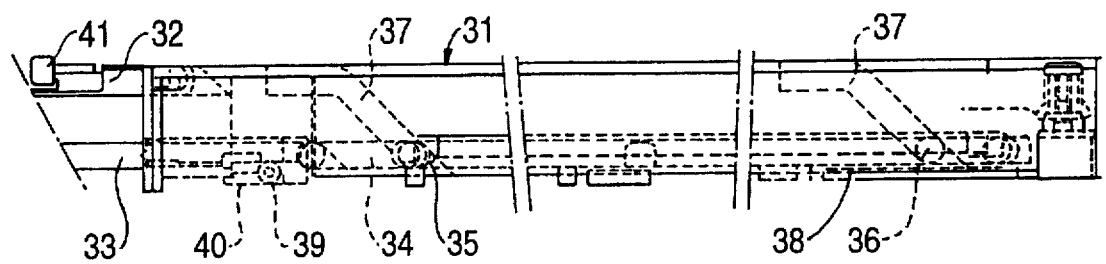
FIG. 6 shows a side view of the end portion of the conveyor track where the conveyor trolleys are brought down.

FIG. 6 shows a side view of the end portion of the transport track 31. After the remaining portion of a scrapped car has been removed from a conveyor trolley 25 and its supporting members 30 have been pivoted inwards, the trolley is brought from the higher track portion 32 to the lower track portion 33. For that purpose, there is a vertically movable track portion 34 which is supported by a framework 35 provided with four wheels 36 extending through guides 37.

The framework 35 is pivotably connected to the one end of a pressurized medium cylinder 38, that has its other end connected to a fixed part of the transport track 31. By pushing the piston rod of the cylinder 38 outwards, the framework 35 can be brought from the lowermost position shown in FIG. 6 to the uppermost position, after a conveyor trolley has been brought upon it.

There, the track portion 34 first moves in vertical height and thereupon in longitudinal direction as well, so that the rails of the track portions 32 and 34 connect to each other properly. To that end, the ends of the rails of both portions can additionally be bevelled.

The track portions 32 and 33 are provided with sprocket wheels 39. A chain extending along the track portion concerned runs across each pair of sprocket wheels. The chains 40 are provided with drivers 41, which can cooperate with driver members 42 mounted to the conveyor trolleys 25.

Figure 7:
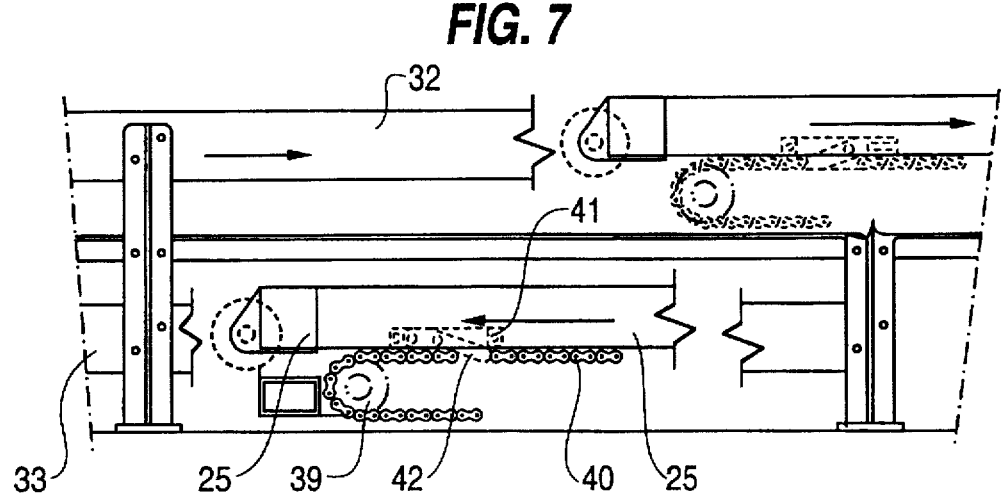
FIG. 7 shows a part of an upper and of a lower conveyor track with a conveyor trolley on each of them.

The chains 40, the drivers 41 and the driver members 42 are shown in particular in FIG. 7. It will be obvious, that the chain 40 of a higher track portion 32 lies staggered in relation to that of a lower track portion 33, and that two driver members 42, being staggered as well, are mounted to the conveyor trolleys 25, each of said members serving for cooperation with a driver 41 mounted to the chain concerned. With the help of one of the sprocket wheels 39, the chains 40 can be moved in a certain direction only, as indicated by arrows in FIG. 7.

The vertically movable track portion 33 is provided with two sets of sprocket wheels 39 having chains 40, each in line with a chain of one of the track portions 32 and 33, so that the conveyor trolleys 25 are movable in both directions across the track portion 34 by movement of one of the chains, each of which being movable in one direction only.

The device shown in FIG. 6 is correspondingly applied at the beginning of the transport track 31 in order to bring a conveyor trolley 25 from the lower track portion 33 onto the higher track portion 32. The portion of the transport track 31 situated between the end portions can be divided into a number of sections having their ends provided with sprocket wheels 39 across which there is a chain extending along the transport track section concerned. Then, the chain of the section need only be calculated for moving one or at the most some conveyor trolleys 25.

Figure 8:
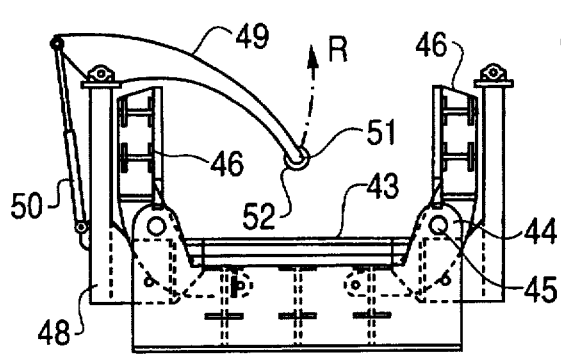
FIGS. 8 and 9 show side views of the press in the opened and closed position, respectively.
Figure 9:
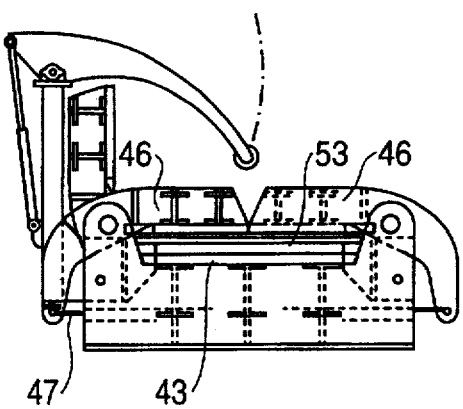

The FIGS. 8 and 9 show a press as can be applied in particular for crushing the body of a car, substantially consisting of metal.

The press comprises the bearing plate 43 with the edges 44 projecting upwards and being provided with pivots 45 for pivotably connecting clamping jaws 46 to the bearing plate. Pivoting the clamping jaws 46 takes place with the help of the pressurized medium cylinders 47.

A support 48, to which an arm 49 is pivotably mounted, is secured at one side of the bearing plate 43. Pivoting the arm 49 takes place with the help of the hydraulic cylinder 50. The free end 51 of the arm 49 extends across a certain length of the press and is provided with a roller 52.

The arm 49 should be pivoted upwards from the position shown in FIG. 8 to an approximately vertical position as indicated by the arrow R, before the body of a scrapped car can be positioned on the bearing plate 43. Then, a car body can be positioned on the bearing plate and the car body roof can be crushed by means of the arm 49 by pivoting the arm in a direction opposite to the arrow R. The clamping jaws 46 will also be pivoted towards the bearing plate 43 in order to press the car body to a small parcel 53. The end position of both clamping jaws 46 with the parcel 53 between them and the bearing plate 43 is shown in FIG. 9.

Figure 10:
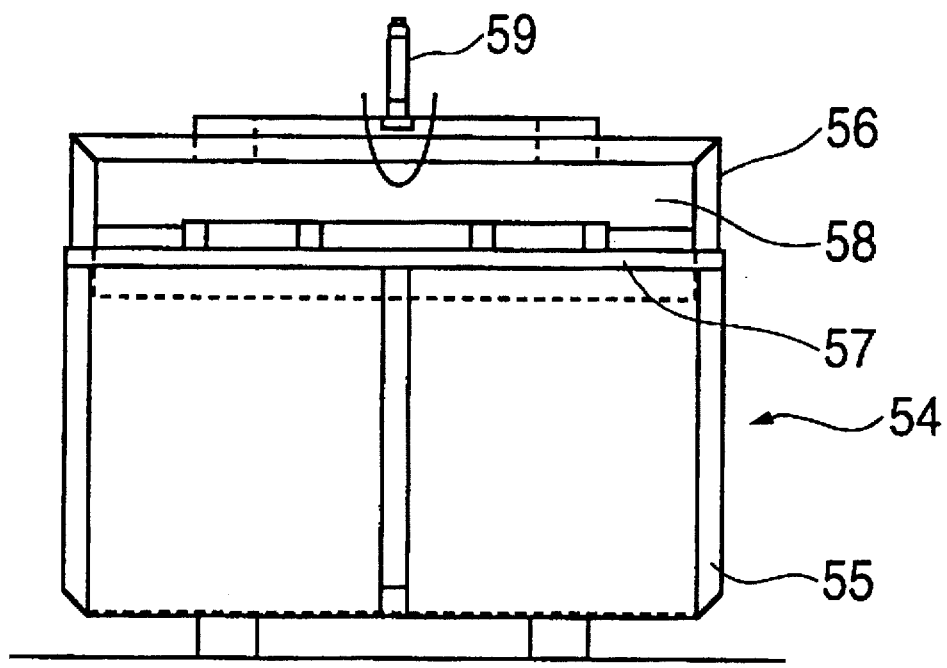
FIG. 10 shows a side view of a waste glass container for removing a window from a car door.

FIG. 10 shows a side view of a waste glass container 54 for removing a window from a car door. Its casing 55 is provided with a lid 56 in such a way that a slot 58 remains free between one upper edge 57 of the casing 55 and the lid 56. Through the slot 58 a car door, not further indicated, can be partially slid in, in such a way that the car door window will come to lie beneath an impact tool 59. With the help of this impact tool 59 the window can be crushed and the glass splinters will immediately fall into the casing 55. A part of the car door will be supported by supporting plates not further indicated.

It can be remarked that instead of using a chain 4—see FIG. 3—for pivoting the framework 2 it is possible to use at least one hydraulic cylinder 60 as this, by dash lines, is indicated in FIG. 3. One side of said cylinder 60 is connected to the frame 1 and the other end to a support 61 of the framework 2. Means can be used by which movement of the piston rod of the cylinder is prevented when the pressure of the medium fails. It is also possible to connect the cylinder to one of the legs of a hooked lever which is pivotable connected to the framework 2. The other leg of said lever then being connected to the pin 7 by means of a chain.

It will be obvious that only some possible embodiments of a device according to the invention are shown in the drawing and have been described above and that many changes can be made without leaving the inventive concept.

We claim:

1. A device for scrapping cars, said device comprising:
   a plurality of stations;
   conveyor trolleys guiding a car through the plurality of stations and stopping at least one station;
   wherein at least one of the stations includes a turning device raising a car and rotating the car about its longitudinal axis such that a bottom of the car becomes accessible from above, the turning device comprising:
   a framework;
   a bridge pivotally mounted on the framework such that the bridge is rotatable about its longitudinal axis;
   a bridge rotating and vertical adjusting mechanism adjusting and rotating the bridge in a vertical direction;
   at least one supporting member having a first leg and a second leg, the first and second legs being rotatably supported on the bridge at first ends of the legs;
   a pair of clamping bars having clamping members, the clamping bars being connected to the at least one supporting member such that the clamping bars can be pushed toward and away from each other; and
   a leg pivoting mechanism pivoting the first and second legs such that the clamping bars can be moved toward and away from each other.

2. The device according to claim 1, wherein the first leg is rotatably connected to the bridge by a first pivot, and the second leg is rotatably connected to the bridge by a second pivot, the first pivot being spaced from the second pivot.

3. The device according to claim 1, wherein second ends of the first and second legs are connected to each other by a cylinder and by a coupler extending between the first and second legs, such that upon operation of the cylinder, the first and second legs are rotated over substantially equivalent angles.

4. The device according to claim 3, wherein the coupler includes at least one coupling plate having a first pivot point and a second pivot point, and is pivotally connected at the first pivot point to the first leg and at the second pivot point to the second leg.

5. The device according to claim 4, wherein the first pivot point of the coupling plate is located in a first direction from the first pivot, and the second pivot point of the coupling plate is located in a second direction, opposite the first direction, from the second pivot; and
   a center of a connecting line between the first and second pivot points of the coupling plate coincides with a center of a connecting line between the first and second pivots.

6. A device according to claim 1, including a frame surrounding the framework, and wherein the framework is pivotally connected to the frame such that upon pivoting the framework, the bridge, being connected to the framework, is adjusted in the vertical direction.

7. A device according to claim 6, further comprising an assisting mechanism, in the form of a chain or a hydraulic cylinder, assisting in rotating the bridge.

8. A device according to claim 7, wherein the assisting mechanism is connected to a spring-tensioned locking pin and is removed from a hole in the frame before the bridge is free to rotate.

9. A device according to claim 8, wherein a plurality of holes are provided in the frame for receiving the locking pin.

10. A device according to claim 1, wherein the conveyor trolleys include longitudinal edges having trolley supporting members which are pivotable up to 180°; and
    the trolley supporting members are spaced from each other in a longitudinal direction of the conveyor trolley such that in an outward pivoted state of the trolley supporting members, the trolley supporting members extend substantially horizontally and support wheels or axles of a car to be scrapped, and such that in an inward pivoted state, the trolley supporting members partially overlap and extend within the conveyor trolley.

11. A device according to claim 10, further comprising:
    a conveyor track having a beginning portion, an end portion, a higher track portion, a lower track portion, and a vertically adjustable track portion; and
    chain drivers mounted to chains for driving the chains;
    wherein the conveyor trolleys are provided with means for engaging the chain drivers at the beginning portion and the end portion of the conveyor track; and
    wherein the vertically adjustable track portion is adjusted by at least a first chain which is movable in opposite directions, the upper conveyor track portion is provided with a second chain movable in a single direction, and the lower conveyor track portion is provided with a third chain which is movable in a single direction.

12. A device according to claim 11, further comprising a releasably coupler coupling the conveyor trolleys on the upper conveyor track portion to the second chain.

13. A device according to claim 1, further comprising a press mounted at an end of the conveyor track, the press pressing flat a remaining part of the car.

14. A device according to claim 13, wherein the press comprises:
    a fixed bearing plate; and
    at least one clamping jaw pivotally connected to the bearing plate at longitudinal edges of the bearing plate;
    wherein the at least one clamping jaw is pivoted from a bearing plate releasing position, in which a car body is placed thereon, to a compressing position in which a car body is compressed; and
    wherein, in the compressing position, the longitudinal edges of the at least one clamping jaw are above the bearing plate and substantially in line with each other.

15. A device according to claim 14, further comprising a support mounted near a longitudinal edge of the bearing plate and extending in an upward direction; and
    an arm pivotally mounted to the support at a distance above the bearing plate and above the at least one clamping jaw when the at least one clamping jaw is in an upward directed position;
    wherein the arm is pivoted toward the bearing plate to pivot the at least one clamping jaw and to press the car body toward the bearing plate, thus crushing a roof of a car body in a longitudinal direction of the car body.

16. A device according to claim 1, further comprising:
    a waste glass container including a casing having a side wall, the side wall being provided with a slot into which a car door is inserted;
    an impact device including a sharp pin, and provided above the waste glass container such that the sharp pin exerts an impact on a window of the car door, and splinters of the window fall into the waste glass container.

* * * * *